United States Patent Office 2,848,700
Patented Aug. 19, 1958

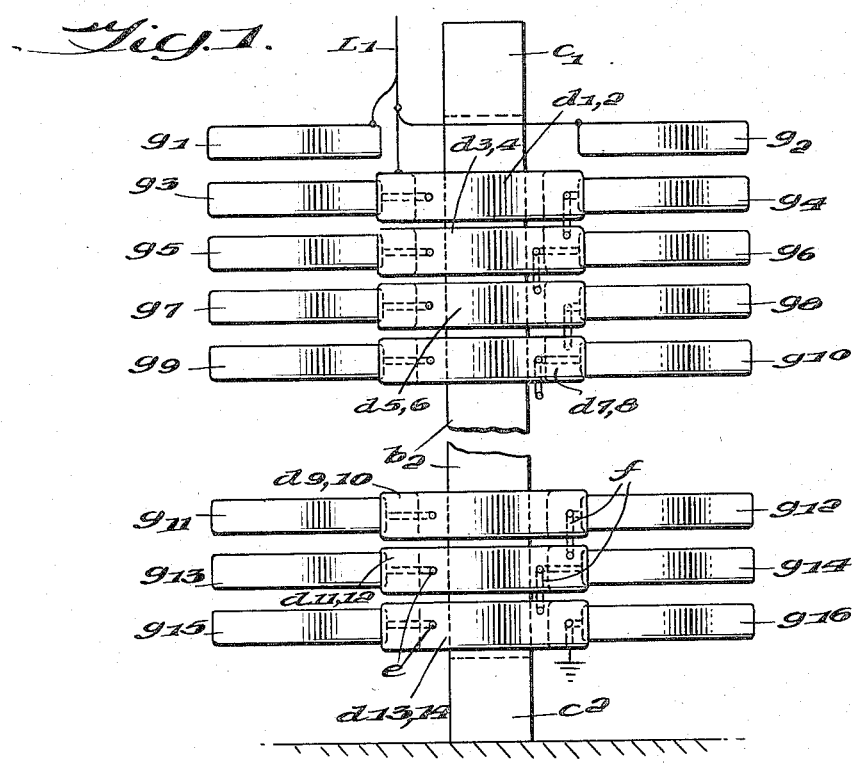
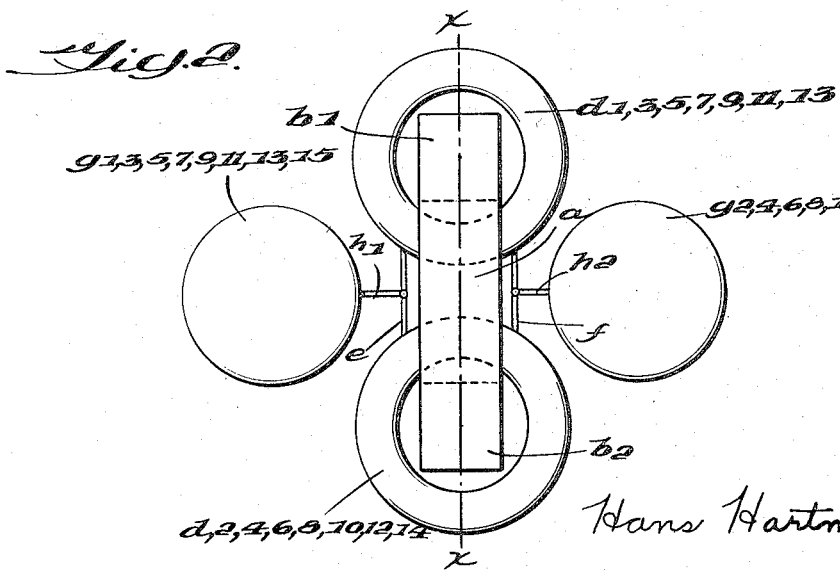

2,848,700

HIGH VOLTAGE TRANSFORMER

Hans Hartmann, Ennetbaden, Switzerland, assignor to Aktiengesellschaft Brown, Boveri & Cie, Baden, Switzerland Application November 30, 1954, Serial No. 472,191

Claims priority, application Switzerland December 10, 1953

3 Claims. (Cl. 336—70)

The present invention relates to transformers of the high tension type such as high voltage transformers and in particular to an improved arrangement for strengthening the resistance of the high voltage transformer windings to better withstand transient voltage surges. This type of protection is necessary to prevent a breakdown in the insulation between the various coils which make up the primary i. e. high voltage winding when voltage surges appear on the line to which the transformer primary is connected.

It is known that the resistance to surge voltages can be increased by adding capacities in circuit with the various coils of the transformer winding and which improve the distribution of the surge voltage, and particularly at the high voltage end of the winding. As capacities, control screens are frequently used which are not galvanically coupled, that is by means of conductors, to the various coils of the winding. Such control screens must have rather large dimensions to obtain the result desired, and consequently they take up a correspondingly large amount of space and hence correspondingly enlarge the overall dimensions of the transformer apparatus and hence also its cost. It is also known to arrange capacities in direct connection with the various coils of the transformer winding. In this case, the connections between the capacities and the coils constitute electrically weak points which because of their difficulty to access, can be safeguarded at best only in a rather imperfect manner.

The object of the present invention is to provide an improved arrangement of capacities for increasing the surge voltage or potential strength of a transformer and is characterized by a transformer having a winding made up of pancake type coils distributed in superposed relation on two parallel legs or columns of the transformer core, the coils being connected in series alternating from one column to the other, and the capacities being constituted by groups of capacitor elements such as plates or the like disposed respectively on opposite sides of the central plane established through the two core columns and connected respectively to the transformer winding at the conductor portions interconnecting the plurality of series-connected pancake coils. To assure a distribution of the surge voltage which will be as linear as possible over the transformer coils, the capacitance values of the capacitor units placed between the coils can be progressively decreased from the input side of the winding, i. e. that coil at the end of the winding to which the high voltage line is connected, the opposite end of the winding usually being grounded.

The invention is illustrated in the accompanying drawings which are understood to be directed toward an embodiment of the invention that is typical rather than limitative with regard to the structural variations permissible within the scope of the inventive concept claimed hereinafter.

In the drawings,

Fig. 1 is a view in side elevation of a transformer construction embodying capacitors arranged according to the invention, the view being somewhat diagrammatic and omitting elements of the transformer not essential to an understanding of the invention; and Fig. 2 is a top plan of the transformer seen in Fig. 1.

With reference now to the drawings the core of the transformer designated by the letter $a$ is seen to be closed and having a rectangular configuration. The core is comprised of two parallel upright columns $b1$ and $b2$ which are interconnected across their opposite ends by horizontal core members $c1$ and $c2$ respectively. The high voltage winding of the transformer is constituted by a plurality of annular pancake type coils $d1$ to $d14$ which are divided between and placed upon the two core columns $b1$ and $b2$, the coils of odd number from $d1$ through $d13$ being placed on core column $b1$, and the coils of even number from $d2$ through $d14$ being placed on core column $b2$. As indicated on the drawing, coils $d1$ and $d2$ are disposed at the same level on the core columns and the same is true with respect to all the other coil pairs such as $d3$–$d4$, $d5$–$d6$, and $d13$–$d14$. The coils of each pair lying at the same level on the cores are connected together in series by conductors $e$ and each coil pair is connected in series with the next adjacently positioned coil pair on the core columns by means of conductors $f$. Coil $d1$ of the uppermost coil pair i. e. at this end of the transformer winding is connected to the high voltage lead-in conductor L1 and coil $d14$ of the lowermost coil pair i. e. at the opposite end of the transformer winding is grounded. It will be noted from Fig. 2 that all of the coil interconnecting conductors $e$ lie on one side of a plane $x$—$x$ drawn through the center of the core columns $b1$ and $b2$, and that all of the coil interconnecting conductors $f$ lie on the opposite side of such plane, and that all the conductors $e$ and $f$ are easily accessible. It is however possible to arrange both the interconnecting conductors $e$ and $f$ substantially in the plane passing through the centers of the core columns.

The low voltage winding of the transformer as well as the insulation on the windings has been omitted from the drawings in order to simplify illustration and also because such elements are not essential to an understanding of the invention.

In accordance with the invention, the capacities for obtaining a uniform distribution of any transient surge voltage appearing on the transformer winding are constituted by two groups of capacitor elements arranged respectively on opposite sides of the central plane $x$—$x$ through the core columns, the capacitor elements of each group being connected respectively to the transformer winding at the conductors interconnecting the coils and which conductors lie on the same side of the central plane $x$—$x$ through the core. As seen in the drawing, the capacitor elements are constituted by circular electrically conductive plates $g1$ through $g16$ disposed parallel with the pancake coils $d1$—$d14$. The odd numbered plates $g1$ through $g15$ are arranged in superposed parallel spaced relation to form a capacitor group at that side of the central plane $x$—$x$ adjacent the coil interconnecting conductors $e$ and are connected respectively to the coil interconnecting conductors $e$ by means of conductors $h1$. Similarly, the even numbered plates $g2$ through $g16$ are arranged in superposed parallel spaced relation to form a second capacitor group at the opposite side of the central plane $x$—$x$, i. e. at the side adjacent the coil interconnecting conductors $f$ and are connected respectively to the latter by means of conductors $h2$. Moreover, as illustrated, the capacitor plates $g1$—$g16$ preferably extend in part into the space lying between the coils $d1$—$d14$ grouped on the core columns. Also the capacitor plates and their connection means $h1$ and $h2$ are disposed at the same general level as the corresponding coil interconnecting conductors e and f. Also it is seen that the uppermost capacitor plate of each group, i. e. plates $g1$ and $g2$ lie at a level above the uppermost coil pair $d1$ and $d2$ and are each connected to the high voltage lead-in line L1. The lowermost capacitor plate $g16$ is grounded.

Thus it is seen that by the particular arrangement and location, according to the invention, of the transformer coils and capacitor plates and the electrical interconnections therebetween, one is able to attain an arrangement wherein all electrical connections are easily accessible and hence can be made with electrically safe ways and means. As explained in the introduction, it is preferred to graduate the values of the capacitance of the various capacitors in a decreasing manner from the input side of the transformer winding, i. e. the end of the winding to which the high voltage line L1 is connected, in order to assure a substantially uniform distribution of any surge voltage over the winding. The graduation in capacity can be brought about by use of capacitor elements of equal size and varying the distance between them, or conversely by using capacitor elements graduated in size and with equal spacing therebetween.

The capacitor elements according to the invention have been illustrated as circular plates. Such a configuration is not however the only arrangement possible. They can especially have curved surfaces, for example, they can form hat-shaped elements which can be stacked. It is also advantageous to round the capacitor elements off on all sides. The capacitor voltage divider according to the invention can also be built up with voltage control units which are not superposed in the form of columns, as illustrated but which rather are grouped telescopically, concentric to each other.

I claim:

1. In a high voltage transformer having a high voltage input lead and a ground connection, the combination comprising a closed magnetic iron core having a pair of parallel columns; a high voltage winding including an equal number of pancake type coils arranged on each of said core columns in superposed relation, the coils on one column being opposite corresponding coils on the other column, the uppermost coil of one column being connected to the high voltage lead and the lowermost coil of the other column being connected to ground, and means connecting said coils in series comprising first conductor means connecting oppositely-located coils together in pairs and second conductor means connecting one coil of each coil pair mounted on one column with one coil of an adjacent lower coil pair mounted on the other column; capacitance means having capacities graduated in decreasing values from the high voltage input lead to ground comprising two equally-numbered groups of electrically conductive plates disposed in superposed relation on opposite sides of a plane established centrally through said core columns, said plates and said coils being parallel, the uppermost plates of each group lying above the uppermost coil pair and being connected to the high-voltage lead and the other plates of each group lying respectively substantially in the planes of each of said coil pairs; means for electrically connecting each of the plates on one side of said plane established centrally through the core columns with each of the first conductor means nearest adjacent thereto respectively; and means for electrically connecting each of the plates on the other side of said plane established through the core columns with each of the second conductor means nearest adjacent thereto respectively.

2. A high voltage transformer as defined in claim 1 wherein said first conductor means are on one side of the plane established centrally through the core columns and said second conductor means are on the other side of said plane established centrally through said core columns.

3. A high voltage transformer as defined in claim 2 wherein said electrically conductive plates extend at least partially into the space between the coils mounted on opposite columns.

References Cited in the file of this patent

UNITED STATES PATENTS

| | | |
|---|---|---|
| 1,129,471 | Fortescue | Feb. 23, 1915 |
| 1,585,448 | Weed | May 18, 1926 |
| 1,934,501 | Hodnette | Nov. 7, 1933 |

FOREIGN PATENTS

| | | |
|---|---|---|
| 294,051 | Switzerland | Jan. 4, 1954 |